Patented June 1, 1948

2,442,658

UNITED STATES PATENT OFFICE 2,442,658

STARCH STABILIZER

Robert L. Lloyd, Laurelton, N. Y., assignor to American Maize-Products Company, a corporation of Maine No Drawing. Application May 7, 1946, Serial No. 667,995

6 Claims. (Cl. 99—139)

This invention relates to a starch stabilizer.

The stabilizer is particularly useful in connection with pie fillings and the invention will be first illustrated, therefore, by description in connection with such use.

In the standard commercial method of making pies with canned fruit, for instance, it is customary to use starch to decrease settling or floating of the fruit after filling into the pie and during baking and also to give proper consistency to the filling after cooking. In order to avoid settling of the starch itself between the time when the starch is admixed and the temperature later raised to the pasting point, it is necessary to precook the starch.

This precooking of the starch in the usual commercial technique involves draining the juice from the fruit, mixing the starch with the juice so separated, cooking the suspension of the starch in the juice until the starch is pasted, then quickly adding the fruit, so as to cool the resulting mixture and minimize the period of time during which the starch is in contact with the acids of the fruit juice at the elevated temperature of pasting, then pouring the mixture of pasted starch, juice, and fruit into the shaped crust, and finishing and baking the pie in usual manner.

Obvious disadvantages in this procedure include the necessity of the several operations mentioned—the initial separation of the juice from the solid portions of the fruit, pasting the starch in this juice, and quickly cooling the product, once the pasting is completed, to below the temperature of substantial hydrolysis of the starch by the acidity of the fruit. At the same time these steps have been necessary to avoid not only settling of the starch but also settling or floating of the fruit itself in the pie filling before the usual gelatinization of the starch converts the pie filling to a medium in which the fruit does not settle or float objectionably.

The present invention provides a starch stabilizer which may be mixed directly with the canned fruit without previous separation of the juice and that may be used in the form of a cold mix without any previous heating of the starch.

Briefly stated, the invention comprises a starch stabilizer consisting of a mixture of pregelatinized and normal or non-gelatinized starch. The invention comprises also pie-making material including my improved stabilizer and conventional pie filler ingredients and also the method of making pies with a single cooking instead of the usual method involving precooking and cooling of the filling before being placed upon the crust.

A special result is obtained from the use of the mixture of normal and pregelatinized starch, this result being the unexpectedly favorable behavior of the mixture under conditions that would be expected to result in objectionable sedimentation of the normal starch from an aqueous suspension of the mixture of starches.

Factors which are ordinarily controlling in the rate of settling are the particle size of the suspended material, viscosity of the suspending medium, and difference in density of the suspended particles and the medium. I have now found that settling of suspended starch, departs from what was to have been expected on the basis of particle size, viscosity, and densities when the suspending medium is an aqueous pregelatinized starch solution, this term including colloidal dispersion.

This departure will be evident from the data which is given below.

In obtaining this data there were first made three suspending media of the same viscosity. There was made one medium containing 30 grams (g.) of pregelatinized waxy maize starch in sufficient water to make 300 ml. of total mixture. The viscosity of this material, as determined on the Brookfield viscosimeter with No. 1 spindle at 30 R. P. M., was 21.8. The second medium was a water solution of glycerine of percentage of glycerine adjusted to give a medium of viscosity identical with that of the first medium. A third solution was made by dissolving corn syrup in water in proportions to give the same viscosity. The specific gravities of the three solutions were 1.036, 1.207, and 1.272, respectively.

Into each of the media there was introduced, and thoroughly distributed by shaking, regular or non-gelatinized waxy maize starch, the size of grains and their density being the same in all of the mixtures inasmuch as the same starch was used in each mixture.

Thus ten grams of powdered waxy maize starch of pure food quality was then added to a sufficient quantity of each of the three media to give a total of 100 ml. Each of the mixtures were then shaken in 100 ml. graduated glass cylinders. After the mixtures were throughly shaken, the cylinders were allowed to stand on the laboratory desk and the volume of clear liquid which appeared above the starch, as the starch layer settles, was noted at intervals. The amount of this clear liquor is a measure of settling. Below the settled clear layer, there was intense milkiness due to the suspension of non-gelatinized starch associated with the suspending medium. The results follow:

| Period of Settling, Hours | Volume of Clear Liquid at Top of Cylinder When Suspending Medium Contains: | | |
|---|---|---|---|
| | Pregelatinized Starch | Glycerine | Corn Syrup |
| 0 | 0 | 0 | 0 |
| 17½ | 19.5 | 31.0 | 30.0 |
| 116 | 20.0 | 82.5 | 81.5 |

It will be noted that the rate of settling of the pure food starch is much less when the suspending medium is a solution of the pregelatinized starch than when the suspending medium is of the same viscosity but includes, in place of the pregelatinized starch, glycerine or corn syrup, even though the latter two media are of higher density.

Also, the thickening which occurs in the bottom of the cylinders shows much slower rate of settling from first to last of the starch in the pregelatinized starch solution than in the other solutions.

As an explanation of the effect of the pregelatinized starch in causing the settling of the suspended starch and the density of medium relationship to be contrary to that expected, I consider the chemical similarity of the pregelatinized starch dissolved in the suspending medium and of the suspended powdered starch to be an important factor, the two kinds of starch tending to remain associated in the suspension so that the suspended starch does not settle away from the gelatinized starch as rapidly as the starch settles in the other cylinders containing, as the dissolved substances, materials that are less similar to the suspended starch but are more dense.

As the starch used in making the pregelatinized material of the present invention and also as the suspended non-gelatinized starch, best results are obtained when the starch is waxy starch, particularly waxy maize or waxy sorghum starch. Good results are obtained, however, when the waxy starch is substituted by regular corn, tapioca, potato, sweet potato, or like commercial variety of starch, both as the starch to be pregelatinized and as the starch to be suspended, the substitution being in whole or in part.

The starch should be a powder. At least 95% of it by weight should pass through a 100-mesh screen.

That part of the starch selected for the pregelatinized component of my stabilizer mixture is subjected to pregelatinization in contact with moisture in any convenient, conventional manner, as, for instance, by hot rolling, belt gelatinization and drying, and dielectric heating to cause gelatinization followed by drying. As a specific example, roller gelatinization and drying are conducted as follows: a thick suspension of the starch in water is spread on the surface of a steam heated revolving roll, gelatinization and subsequent drying being effected as the roll rotates and the dry starch being scraped off after the product has been dried to between 0.5% and 8% moisture. The steam pressure on the rolls may vary from 50 pounds to 400 pounds and the time of contact of the starch on the roll in the thin film may vary from a few seconds to as long as 90 seconds or so.

The proportion of the pregelatinized starch is preferably maintained at about the minimum which can safely be used for preventing objectionable settling of the remainder of the starch in the mixture made in accordance with the invention, the use in the minimum proportion decreasing somewhat the overall cost for a pound of the mixture. Thus, I use to advantage a minor proportion of the pregelatinized starch. An example is 40 parts to 100 parts of the mixture of pregelatinized and non-gelatinized starch. This proportion of the pregelatinized starch may, however, be varied with results that are satisfactory between 13 and 75 parts of the pregelatinized to sufficient of the other starch to make 100 parts of total starch. When the pregelatinized starch is waxy, the proportion should preferably be 25 to 75 parts for 100 parts of total starch.

The selected pregelatinized and non-gelatinized starch are suitably milled together in dry condition, say at a moisture content not above 8%.

The starch stabilizer is used in making pie fillings, for example, in the proportion of about 5 to 15 parts for 100 water, the proportion of the stabilizer within the range stated being higher with relatively large proportions of sweetening agent used. As the sweetening agent is decreased, on the other hand, the proportion of stabilizer is also decreased to advantage.

Using the mixed starches constituting my starch stabilizer, I have found excellent results in making pies with fruit, lemon, custard, or other flavoring material without having to precook the starch stabilizer before its addition to the pie. The addition of sucrose, say in amounts of 25 to 45% of the sucrose on the whole dry weight of the pie filling in accordance with usual practice, does not interfere with the close association of the suspended and the gelatinized starch in the cold mix.

Likewise a portion of the sucrose may be replaced to advantage by corn syrup or the syrup solids obtained by drying the corn syrup.

The invention will be further illustrated by detailed description in connection with the following specific example of the practice of it.

*Example*

The stabilizer mixture, consisting of 45 parts by weight of pregelatinized waxy to 100 parts total of such starch and non-gelatinized waxy starch, and the sugars are weighed and dry blended to minimize possible lumping of the pregelatinized fraction of the special starch. This blended mixture is then added to the undrained canned sour cherries. Water is then added if any is required, to make up to the desired volume shown below.

After the blend of sugar, starch stabilizer and fruit, has been given the necessary physical mixing for uniform distribution throughout the wet mass, the filling then is deposited in the unbaked crust. A crust composition may be laid over the filling. The pie is then placed in the oven and baked.

As to proportions used, there are added to each 10 pounds of fruit juice and added water if any, 5 pounds of sucrose, 2 pounds corn syrup solids, and approximately 1 pound as, for example, 0.5 to 1.5 pounds of the starch stabilizer mixture.

Proceeding as described, I find that there is no objectionable settling of the starch in the pie filling even though the major part of the starch is not pregelatinized. Also there is no objectionable rising (or sinking) of the fruit in the composition, in contrast to the floating or settling of the fruit which is experienced when non-gelatinized starch is used as the only starch in the making of the pie filling.

The cherry filling was selected for the example because it involves a large number of problems, particularly of the tendency of the enzymes and acid present to liquefy starch.

The proportion of sugar and corn syrup solids may be varied to suit the taste. With other fruits than cherries, the proportion of total sweetening agent generally is reduced. This reduction of sweetening agent makes possible also the reduction of total starch as less starch is required to thicken the medium containing the lower sugar content.

My invention is useful in making pies of the general class which involve the use of a precooked filling followed by baking subsequent to the introduction of the filling. These are normally fruit pies with two crusts, although chicken pie and meat pies are examples of pies of the class to which my invention is applicable.

It will be understood also that it is intended to cover all changes and modifications of the example of the invention herein chosen for the purpose of illustration which do not constitute departures from the spirit and scope of the invention.

What is claimed is:

1. A starch stabilizer of abnormally low settling rate when suspended in an aqueous medium, the stabilizer comprising a mixture of substantial proportions of pregelatinized and non-gelatinized starch.

2. A starch stabilizer of abnormally low settling rate when suspended in an aqueous medium, the stabilizer comprising a mixture of pregelatinized and non-gelatinized starch, the proportion of the pregelatinized starch being 13 to 75 parts for 100 parts of total dry weight of starch.

3. A starch stabilizer as described in claim 1, the starch being waxy starch and the proportion of the pregelatinized starch being 25 to 75 parts for 100 parts of total starch.

4. A starch stabilizer as described in claim 1, the starch being pulverized and of particle size to pass to the extent of at least .95 per cent through a 100-mesh screen.

5. Pie filling comprising starch stabilizer of the kind described in claim 1, an aqueous solution of sweetening agent, and flavoring material, the proportion of total starch being about 5 to 15 parts for 100 parts of water in the aqueous solution.

6. A starch stabilizer of abnormally low settling rate when suspended in an aqueous medium, the stabilizer comprising a mixture of substantial proportions of pregelatinized and non-gelatinized starch, and a sugar serving as sweetening agent.

ROBERT L. LLOYD.

REFERENCES CITED

The following references are of record in the file of this patent:

UNITED STATES PATENTS

| Number | Name | Date |
|---|---|---|
| 2,045,019 | Lorenzen | June 23, 1936 |
| 2,257,599 | Frischmuth et al. | Sept. 30, 1941 |
| 2,314,459 | Salzburg | Mar. 23, 1943 |
| 2,406,585 | Buchanan et al. | Aug. 27, 1946 |